United States Patent [19]
Olson

[11] Patent Number: 5,468,028
[45] Date of Patent: Nov. 21, 1995

[54] QUICK CONNECT TUBE COUPLINGS

[75] Inventor: Darwin C. Olson, Franklin, Tenn.

[73] Assignee: Dana Corporation, Toledo, Ohio

[21] Appl. No.: 358,889

[22] Filed: Dec. 19, 1994

[51] Int. Cl.⁶ .................................................. F16L 21/06
[52] U.S. Cl. .......................... 285/322; 285/331; 285/242; 285/382
[58] Field of Search .................................. 285/322, 323, 285/347, 331, 234, 239, 240, 241, 242, 246, 243, 255, 101, 382; 138/89.3, 89.4, 96 R, 89

[56] References Cited

U.S. PATENT DOCUMENTS

| | | | |
|---|---|---|---|
| 3,840,256 | 10/1974 | Cox, Jr. | 285/331 |
| 3,923,323 | 12/1975 | Brogan | 285/331 |
| 4,178,023 | 12/1979 | Guest | 285/323 |
| 4,229,025 | 10/1980 | Volgstadt et al. | 285/105 |
| 4,282,175 | 8/1981 | Volgstadt et al. | 264/248 |
| 4,407,526 | 10/1983 | Cicenas | 285/27 |
| 4,482,170 | 11/1984 | Jacobson et al. | 285/55 |
| 4,628,965 | 12/1986 | Passerell | 138/89 |
| 4,712,813 | 12/1987 | Passerell et al. | 285/323 |
| 4,929,002 | 5/1990 | Saur | 285/331 |
| 5,230,539 | 7/1993 | Olson | 285/323 |

FOREIGN PATENT DOCUMENTS 351466  1/1990  European Pat. Off. .

Primary Examiner—Dave W. Arola
Assistant Examiner—Heather Chun Shackelford
Attorney, Agent, or Firm—Millen, White, Zelano, & Branigan

[57] ABSTRACT

Quick-connect couplings having a sleeve with a tubular tube support mounted therein, an internal O-ring, an external O-ring and a collet are configured to retain a tube on the tubular tube support by engaging the tube with the collet. In one embodiment of the invention, the tubular tube support is retained in the sleeve by engagement with a first internal annual shoulder in the sleeve. The interior O-ring positioned against a second annular shoulder within the sleeve. The collet resiliently fits within the sleeve to retain the tubular tube support and internal O-ring in place prior to assembly. An external groove in the sleeve receives an external O-ring to seal with the bore. In another embodiment of the invention, the tubular tube support is staked to a first end of the sleeve by a radially extending flange. The internal O-ring is disposed between the end of the collet and the radially extending flange. An annular trough is provided between the tube support portion and the radially extending flange thereof for receiving the tube. Upon pressing the collet into the sleeve with the tube in place, the tube is locked to provide the quick-connect coupling. An external groove in the sleeve receives an external O-ring for sealing with the bore which receiving the quick-connect coupling. In accordance with a further embodiment, the sleeve has external threads for threading with a standard threaded port, 13 Claims, 3 Drawing Sheets

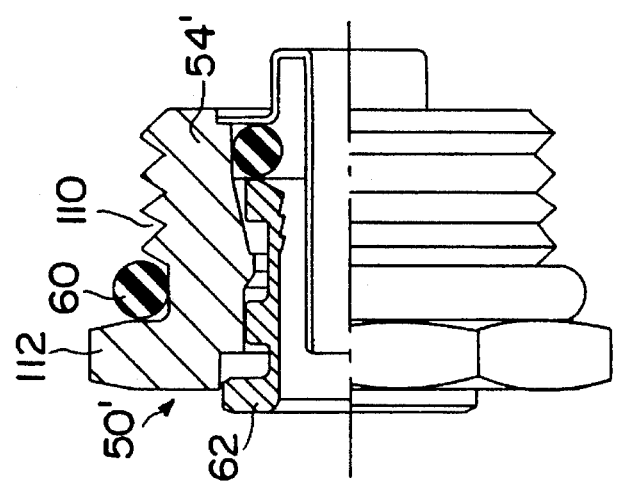
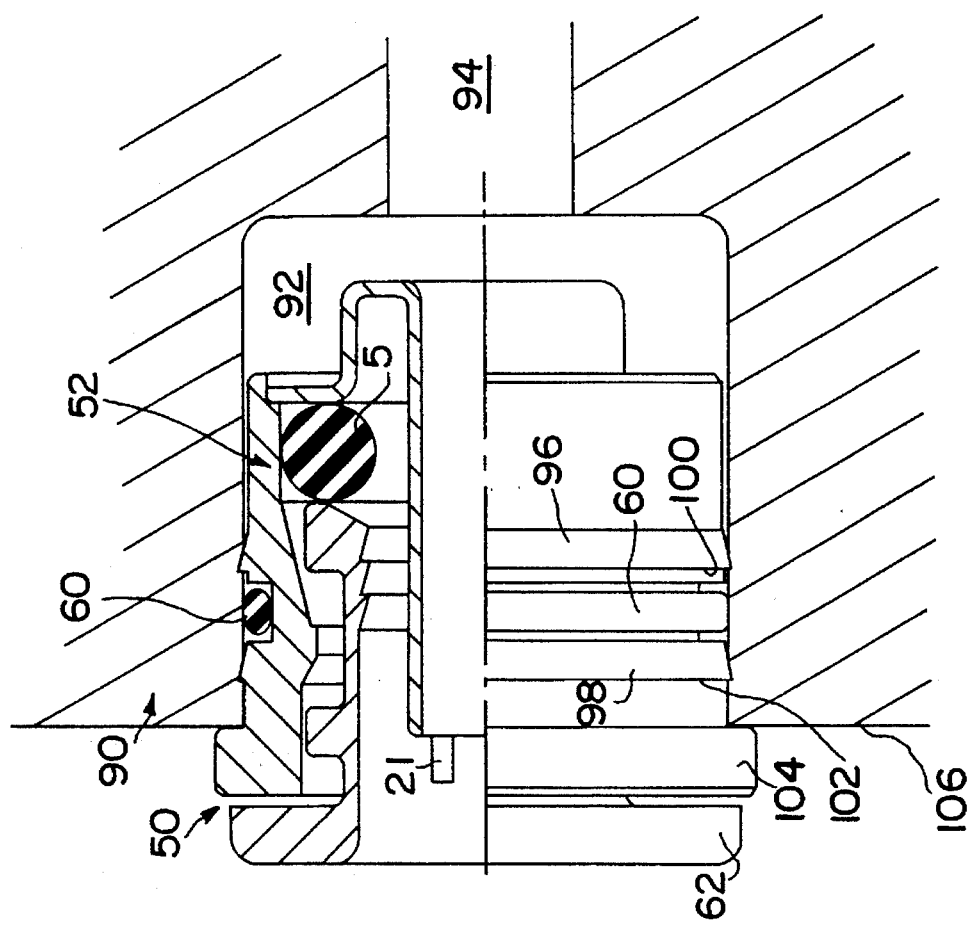

QUICK CONNECT TUBE COUPLINGS

RELATED PATENT APPLICATIONS

U.S. patent application Ser. No. 08/308,895, filed Sep. 20, 1994 pending; U.S. patent application Ser. No. 08/308,906, filed Sep. 20, 1994 pending, and U.S. patent application Ser. No. 08/151,880 filed Nov. 15, 1993 now U.S. Pat. No. 5,429,394.

FIELD OF THE INVENTION

The present invention relates to quick connect tube couplings, and more particularly to improvements in configurations for such couplings.

BACKGROUND ART

Quick-connect tube couplings are used to connect flexible tubes in many different power systems such as, for example, pressured air systems for vehicle air brakes and air conditioning systems which may involve connections to diverse items such as valve bodies, air tanks and the like. Each of the tubes require a coupling to connect the end of the tube to a body which may be a conventional fitting, valve, manifold or similar device for transmitting and receiving pressurized air. Connecting a tube to a body, or removing a tube from a body, can be a time consuming and expensive task which is frequently performed in the field where specialized tubes may not be readily available.

There are a wide variety of "push-to-connect" type couplings which permit a tube to be quickly and easily connected to a body without the use of tools. With these couplings, a tube is connected by simply press fitting the coupling into a bore within the body and then inserting the leading end of the tube into the coupling. Typically, the coupling contains a plurality of components which releasably retain the tube therein.

In order for presently used couplings to perform effectively, the bores in the bodies to which the tubes are connected are stepped and formed with relatively tight tolerances. In order to reduce manufacturing expenses and lessen the occurrence of coupling malfunctions, it is preferable to have unstepped bores which can be made with higher tolerances. Since currently available couplings require stepped bores, there is a need for new quick-connect tube couplings which function effectively with unstepped bore configurations.

As the art progresses to straight bore fittings, fittings are being used such as those set forth in the copending patent applications assigned to the assignee of the present invention and listed under "Related Patent Applications." It has been found, however, that these fittings require the use of larger bores resulting in more material being needed in each fitting as well as increased space requirements. In addition, previously developed end fittings require a bore depth which may be critical to properly seating the coupling and may be excessive for some applications. In any event, it is desirable to, if possible, reduce the overall length of quick-connect couplings.

Generally, the prior art over which improvements are being sought is disclosed in U.S. Pat. No. 5,230,539 issued Jul. 27, 1993, incorporated herein by reference, which discloses a quick-connect coupling, useful to connect tubes within a stepped bore in a body. This coupling includes a tubular tube support of an outside diameter suitable for frictionally engaging the inner wall of a tube and a sleeve, the sleeve having an inner diameter greater than the outer diameter of the tube and an outer diameter complementing the diameter of the bore. The tubular tube support has a radial projection extending therefrom. A collet having an outer diameter complementing the inner diameter of the sleeve and an inner diameter greater than the outer diameter of the tubular tube support is inserted into the sleeve. The tube is fictionally retained in place between the collet and the tubular tube support. An O-ring seal is provided for sealing with the bore.

As the advantages of push-to-connect fittings become increasingly accepted, other applications for those fittings are sought. However, as these fittings are currently configured, ready adaptation is not feasible.

SUMMARY OF THE INVENTION

In view of the aforementioned considerations, it is a feature of the present invention to provide new and improved quick-connect couplings which are useful for insertion into unstepped bores, as well as useful for other applications, such as air tanks and the like.

The present invention relates to a quick-connect coupling, useful to connect tubes within a bore in a body or bushing. The coupling includes a tubular tube support of an outside diameter suitable for frictionally engaging the inner wall of a tube and a sleeve having an inner diameter greater than the outer diameter of the tube and an outer diameter complementing the diameter of the bore for retaining the sleeve in the bore. The tubular tube support has a radial projection extending therefrom. A collet is provided. The collet has an outer diameter complementing the inner diameter of the sleeve and an inner diameter greater than the outer diameter of the tubular tube support, which inner diameter is slightly less than the outer diameter of the tube. The tube is frictionally retained between the collet and the tubular tube support. An O-ring seal is disposed around the coupling for sealing with the bore. The improvement to the quick connect coupling comprises first and second ends on the sleeve with a first step within the sleeve proximate the first end and a second step between the first step and the second ends of the sleeve. The first step engages the radial projection of the tube support and the second step supports an inner O-ring disposed within the sleeve for the sealing with the tube when the tube is inserted therein. With this improvement, the collet retains all of the parts within the sleeve during shipping and handling.

In another aspect, the present invention is directed to a quick-connect coupling, useful to connect tubes within bores formed in bodies. The coupling includes a tubular tube support of an outside diameter suitable for frictionally engaging the inner wall of a tube and a sleeve having an inner diameter greater than the outer diameter of the tube and an outer diameter complementing the diameter of the bore. A collet having an outer diameter complementing the inner diameter of the sleeve and an inner diameter greater than the outer diameter of the tubular tube support in provided. The inner diameter of the collet is slightly less than the outer diameter of the tube, wherein the tube is frictionally retained between the collet and the tubular tube support. At least one O-ring seal for sealing with the bore. The improvement comprises a connection at one end of the sleeve for fixing the tubular tube support thereto. The tubular tube support has a tube support portion and a mounting flange which is joined to the tube support portion by an L-shaped portion having an axially extending section connected to the mounting flange and a radially extending section connected to the tube support portion to form an annular trough between the axially extending section and tube support portion. The annular trough receives the end of the tube. An interior O-ring is disposed between the radially extending mounting flange and the end of the collet for sealing with the tube.

In accordance with more specific aspects of the invention, the quick-connect coupling may be used for connections to tanks, such as air tanks, and may have a threaded portion on the sleeve for threading into the threaded bores.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 4 is a side view, partially in cross-section, illustrating use of the push-to-connect coupling of the present invention in an unstepped bore of a valve body;

FIG. 5 is a side view, partially in cross-section illustrating an embodiment of the present invention in which a sleeve of the coupling is provided with external screw threads;

DETAILED DESCRIPTION

The present invention is an improvement in the type of quick-connect tube coupling disclosed in U.S. Pat. No. 5,230,539 issued Jul. 27, 1993 and incorporated herein by reference.

Figure 1:
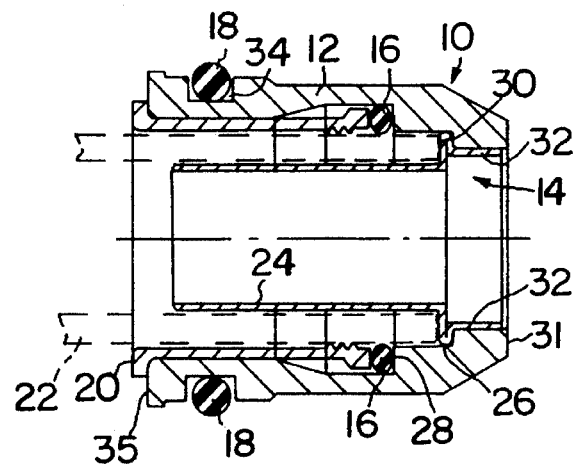
FIG. 1 is a cross-sectional view illustrating a push-to-connect coupling configured in accordance with a first embodiment of the present invention.

Referring now to FIG. 1, there is shown a first embodiment of a quick-connect tube coupling 10, configured in accordance with the principles of the present invention, wherein the quick-connect tube coupling is comprised of a sleeve 12, a tube support 14, an internal O-ring 16, an external O-ring 18 and a collet 20. A flexible tube 22 is received over a first portion 24 of the tube support 14 and is frictionally retained thereon when collet 20 is slid over the tube.

The sleeve 12 is made of a single piece of brass and includes a first internal step 26 and a second internal step 28. The first internal step 26 supports a radial fold 30 of the tube support 14 proximate a first end 31 of the sleeve 12. The radial fold 30 forms a radial projection which extends radially of the tube support 22 and joins a second section 32 of the tube support to the first section 24. The second internal step 28 supports the internal O-ring 16 which seals with the tube 22 when the tube 22 is shoved into the sleeve 12 over the first portion 24 of the tube support 14. The sleeve 12 has an external annular groove 34 proximate the second end 35 of the sleeve which receives the external O-ring 18 that seals with the bore of a body which receives the quick-connect coupling 10 (see FIG. 4).

Quick-connect coupling 10 is assembled by first installing the tube support 14 in the sleeve 12 through the second end 35 of the sleeve and then inserting the O-ring 16 in the sleeve so as to rest on the second internal shoulder 28. The collet 20 is then inserted and the external O-ring 18 placed in the groove 34 of the sleeve. An advantage of the embodiment 10 of FIG. 1 is that it utilizes a standard tube support 14 and can be fabricated utilizing existing manufacturing machinery. Moreover, the components remain together after assembly so that no plug is needed to keep the parts assembled during handling and shipping.

Figure 2:
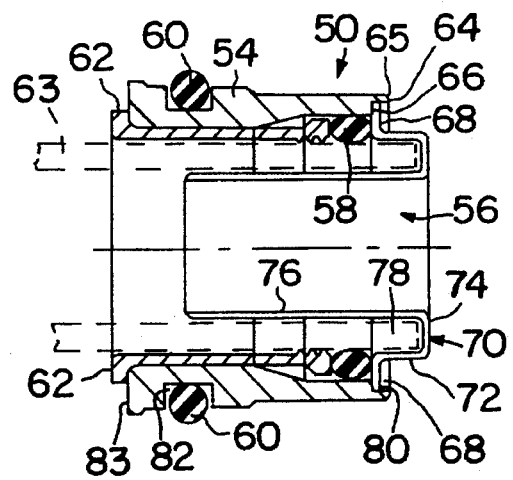
FIG. 2 is a cross-sectional view illustrating a push-to-connect coupling configured in accordance with a second embodiment of the present invention.
Figure 3:
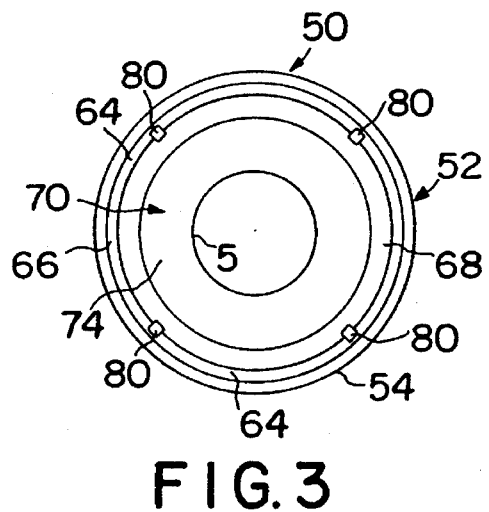
FIG. 3 is an end view of the push-to-connect coupling of FIG. 2.

Referring now to FIGS. 2 and 3, there is shown a second embodiment 50 of a quick-connect coupling configured in accordance with the principles of the present invention. The quick-connect coupling 50 includes a sleeve 54, unitary tubular tube support 56 an internal O-ring 58, an external O-ring 60 and a collet 62. As with the embodiment of FIG. 1, the quick-connect coupling 50 is used to connect a tube 63 to some other element such as a single step bore, air tank or other bore.

The sleeve 54 has a relieved annular end portion 64 at a first end 65 thereof which defines an annular shoulder 66. The annular shoulder 66 supports a radially extending flange 68 extending from the tube support 56. The radial flange 68 is connected to the tubular tube support 56 by a radial flange portion 70 comprised of an axially extending section 72 and a radially extending L-shaped section 74. Between the axially extending section 72 and a tube engaging section 76 of the tube support 56 is an annular trough 78 which receives the end of the tube 63.

As is seen in FIG. 3, the radially extending flange 68 is staked by a plurality of stakes 80 to the annular shoulder 66 at the first end 65 of the sleeve 54. Preferably, the stakes are four in number. Alternatively, the flange 66 is retained with a roll/coin edge that engages the end of the sleeve 54. The internal O-ring 58 rests on the radial flange 68 of the tubular tube support 56 while the external O-ring 60 is received and an annular external groove 82 in the sleeve 54 proximate the second end 83 of the sleeve. As with the embodiment of FIG. 1, the collet 62 slides into the sleeve 52 to secure the tube 63 against the sleeve engaging portion 76 of the tubular support 56.

The assembly sequence of the embodiment of FIGS. 2 and 3 is as follows: the collet 60 is inserted into the sleeve 54 followed by insertion of the internal O-ring 66 from the second end 83 of the sleeve. The tube support 56 is then installed and staked to the sleeve 54. Finally, the external O-ring 60 is inserted into the external groove 82 on the sleeve 54. As with the first embodiment 10 of the quick-connect tube coupling, the second embodiment 50 remains integral after assembly and does not require a plug to keep the component parts assembled. This is advantageous since the expense of the plug may be avoided.

There are a number of advantages to the second embodiment of FIGS. 2 and 3 such as lower "body costs" due to less material and the ability to use a faster machine for manufacturing. The assembly steps are quicker, yet the quick-connect coupling 50 has the same performance as the quick-connect coupling 10, but has a smaller size in that it is shorter. For example, the quick-connect coupling 50 of FIGS. 2 and 3 has a length of 0.910 inch whereas the quick-connect coupling 10 of FIG. 1 has a length of 1.100 inch. Since millions of these quick-connect couplings are utilized, this decrease in length results in substantial monetary savings.

Referring now to FIG. 4, there is shown a first arrangement for utilizing the quick-connect coupling 50 of FIGS. 2 and 3 wherein the quick-connect coupling 50 is utilized with a body such as a valve body 90 having an unstepped bore 92 aligned with a passage 94. The quick-connect coupling 50 is configured as a press-in capsule using a sleeve 52 which may be made of plastic, brass of aluminum. The sleeve has first and second annular barbs 96 and 98 having edges 100 and 102 disposed on opposite sides of the external O-ring 60 which barbs bite into the cylindrical wall of the straight bore 92 to prevent withdrawal of the quick-connect coupling 50. At the front end thereof, the quick-connect coupling has a rim 104 having a diameter substantially greater than the diameter of the straight bore 92 which acts as a stop upon engaging the outer surface 106 of the body 90 to axially position the quick-connect coupling 50 in the bore 92. The depth of the bore 92 is therefore not critical and need be only long enough to accommodate the length of the coupling 50.

Referring now to FIG. 5, there is shown a second configuration 50' for the quick-connect coupling 50 wherein the sleeve 54' has essentially the same internal construction as the sleeve 54 but wherein the sleeve 54' has a different external configuration. Instead of having external barbs, the sleeve 50' has an external thread 110. The thread 110 is disposed at the inboard end of the sleeve 54' with the external O-ring 60 disposed between a nut 112 and the threads 110. The threads 110 are standard SAE threads which screw into a standard SAE port (not shown). In this way, ports which are configured for screw-in fluid couplings can now utilize quick-connect couplings.

Figure 6:
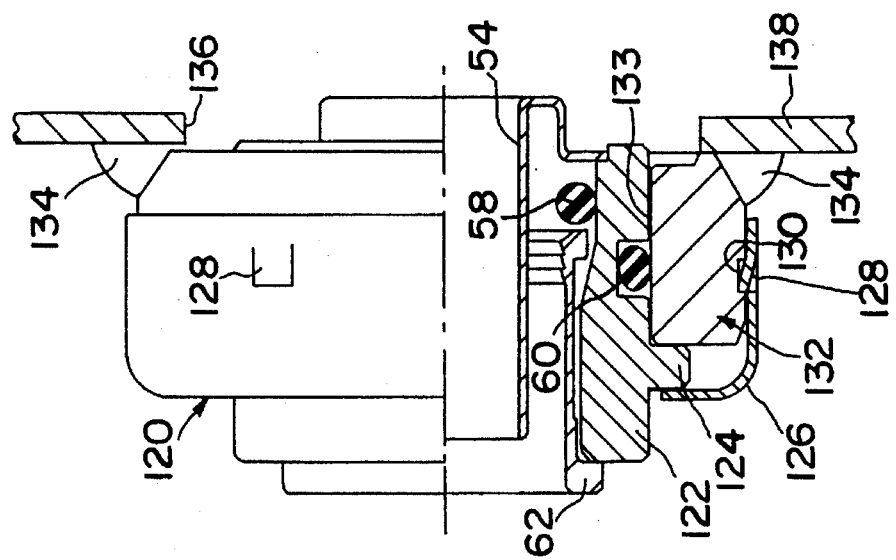
FIG. 6 is a side view, partially in cross section illustrating the push-to-connect coupling of the present invention configured for assembly with a retainer cup useful for making a connection with an air tank.

Referring now to FIG. 6, where a third configuration 120 of the second embodiment of the quick-connect couplings shown in FIGS. 2 and 3 is illustrated, it is seen that the sleeve 122 now has an annular shoulder 124 projecting radially therefrom. The annular shoulder 124 cooperates with a retaining cup 126 which is stamped from steel or brass and includes a plurality of lances 128 that are engaged in a groove 130 formed in the periphery of a weld bushing 132. The weld bushing 132 has an unstepped bore 133 and is secured by a weld 134 in a position aligned with an opening 136 through the wall 138 of an air tank (not completely shown). With this arrangement, a weld bushing, 132, is provided which has no internal steps and allows easier tank weld testing. The fitting 120 is installed by sliding the fitting axially with respect to the weld bushing 132 until the lances 128 in the retainer cup 126 snap into the grooves 132. By simply removing the retainer cup 126, it is easy to replace a damaged, worn or leaking quick-connect coupling 120 with a new coupling. Moreover, the quick-connect coupling need not extend into the interior of the air tank defined by the wall 138.

Figure 7:
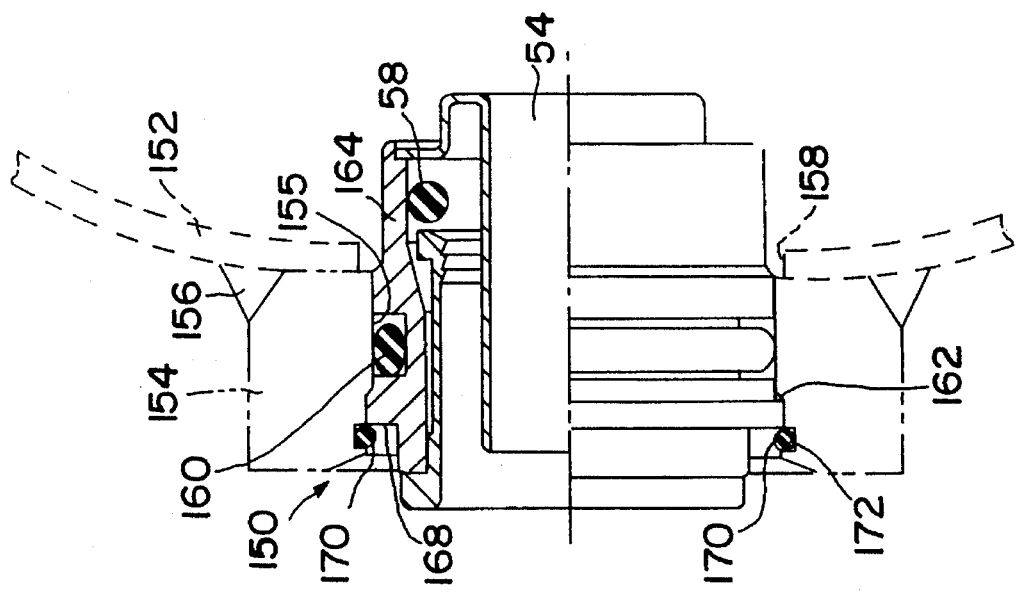
FIG. 7 is a side view, partially in cross section, illustrating utilization of the push-to-connect coupling with air tank.

Referring now to FIG. 7, there is shown an arrangement wherein a fourth configuration 150 of the quick-connect coupling of FIGS. 2 and 3 is shown wherein the quick-connect coupling is configured for use with an air tank (not completely shown) defined by wall 152. In the arrangement of FIG. 7, a weld bushing 154 having a stepped bore 155 is welded by a weld 156 to the wall 152 of the air tank in alignment with a circular hole 158 through the wall. In order to prevent the quick-connect coupling 150 from falling into the tank, the weld bushing 154 has an interior annular shoulder 160 thereon which serves as a stop against an exterior annular shoulder 162 on the sleeve 164 of the quick-connect fitting 150. Shoulder 162 has a major annular face 168 which faces outwardly and is engaged by a spring retainer clip 170 seated within an internally facing annular groove 172 in the bore 155 of the weld bushing 154.

With respect to quick-connect couplings for tanks, the arrangement of FIG. 6 is in most cases preferred because the bore 133 of the weld bushing 132 is unstepped. The annular shoulder 124 of the sleeve 22 serves as a stop instead of cooperation between the shoulders 160 and 162 serving as a stop, which is the case with the quick-connect coupling 150 of the embodiment in FIG. 7. Accordingly, the advantages of using an unstepped bore while still having a positively engaged assembly are achieved in the embodiment of FIG. 7.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a quick-connect coupling, useful to connect a tube within a bore formed in a body, wherein the coupling includes a tubular tube support of an outside diameter suitable for frictionally engaging the inner wall of a tube; a sleeve having an inner diameter greater than the outer diameter of the tube and an outer diameter engaging the diameter of the bore; a collet having an outer diameter engaging the inner diameter of the sleeve and an inner diameter greater than the outer diameter of the tubular tube support and slightly less than the outer diameter of the tube, wherein the tube is frictionally retained between the collet and the tubular tube support, and an exterior seal for sealing with the bore: the improvement comprising:

a first end of the sleeve being fixed to the tubular tube support the tubular tube support having a tube support portion and a mounting flange joined to the tube support portion by an L-shaped portion having an axially extending section connected to the mounting flange and a radially extending section connected to the tube support portion to form an annular trough between the axially extending section and tube support portion for receiving the end of the tube, the radially extending mounting flange being fixed to the first end of the sleeve;

an interior O-ring disposed between the radially extending mounting flange and the end of the collet for sealing with the tube; and an exterior annular groove in the sleeve for receiving the exterior seal.

2. The improvement of claim 1, wherein the radially extending mounting flange of the tubular tube support is staked to the sleeve.

3. The improvement of claim 1, wherein the sleeve has external annular barbs thereon for engaging an internal surface of a bore to prevent withdrawal of the quick-connect coupling from the bore.

4. The improvement of claim 3, wherein the sleeve has a rim proximate the second end thereof having a diameter greater than the diameter of the bore for engaging the body in which the bore is formed to provide a stop for the coupling, whereby the barbs prevent the coupling from being withdrawn while the stop limits the insertion depths of the coupling.

5. The improvement of claim 3, wherein the external groove is disposed between a pair of the annular barbs.

6. The improvement of claim 1, wherein the sleeve has an external thread for threading with a complementary threaded port.

7. The improvement of claim 6, wherein the sleeve has a nut unitary therewith at the second end spaced from the external thread and wherein the exterior seal is disposed in the space between the nut and the thread.

8. The improvement of claim 1, wherein the sleeve has a radially extending shoulder positioned adjacent the first end with the external groove for receiving an external O-ring forming the exterior seal disposed between the radially extending shoulder the second end of the sleeve; the improvement further including a retainer cup which overlies the shoulder on a face thereof facing the second end of the sleeve, the retainer cup further having an axially extending collar portion with at least one fastener thereon for fastening with a weld bushing.

9. The improvement of claim 8, wherein the collar portion of the retainer cup has lances which latch with the weld bushing and wherein the weld bushing has an unstepped bore for receiving the sleeve of the quick-connect coupling.

10. The improvement of claim 8, wherein the weld bushing has an unstepped bore and is welded to the exterior wall of an air tank proximate an opening therethrough with which the tube retained by the quick-connect coupling communicates.

11. The improvement of claim 1, wherein the sleeve has a shoulder thereon having a face, facing toward the second end of the sleeve and a step facing toward the first end of the sleeve with the external groove for receiving an external O-ring forming the external seal positioned between the step and the first end of the sleeve, and wherein the quick-connect coupling is adapted to coupled with a weld bushing welded to a tank having an internal step engaged by the external step of the sleeve and a lock for engaging the face of the shoulder on the sleeve for axially retaining the sleeve within the bore of the weld bushing.

12. The improvement of claim 11, wherein the lock is comprised of an inner annular groove and a retainer clip disposed within the inner annular grove, which retainer clip engages the front face of the shoulder.

13. The improvement of claim 1, wherein the external seal is an O-ring.

* * * * *